United States Patent [19]

Musk

[11] Patent Number: 5,577,146
[45] Date of Patent: Nov. 19, 1996

[54] OPTICAL CONNECTORS

[75] Inventor: Robert W. Musk, Ashbocking, United Kingdom

[73] Assignee: Hewlett-Packard Company, Palo Alto, Calif.

[21] Appl. No.: 374,511

[22] PCT Filed: May 28, 1993

[86] PCT No.: PCT/GB93/01124

§ 371 Date: Jan. 13, 1995

§ 102(e) Date: Jan. 13, 1995

[87] PCT Pub. No.: WO94/01797

PCT Pub. Date: Jan. 20, 1994

[30] Foreign Application Priority Data

Jul. 14, 1992 [JP] Japan .................................. 4-186779

[51] Int. Cl.⁶ ............................................................ G02B 6/36
[52] U.S. Cl. ..................................................................... 385/92
[58] Field of Search ................................... 385/16, 18, 19, 385/22, 23, 53, 56, 58, 60, 62, 63, 69, 70, 78, 81, 83, 88, 92, 93, 94

[56] References Cited

U.S. PATENT DOCUMENTS

| | | | |
|---|---|---|---|
| 4,240,695 | 12/1980 | Evans | 385/62 |
| 4,268,115 | 5/1981 | Slemon et al. | 385/92 |
| 4,273,413 | 6/1981 | Beudiksen et al. | 385/92 |
| 4,547,039 | 10/1985 | Caron et al. | 385/92 |
| 4,674,831 | 6/1987 | Bagby | 385/60 |
| 5,076,656 | 12/1991 | Bridggs et al. | 385/60 |
| 5,347,604 | 9/1994 | Go et al. | 385/92 |

FOREIGN PATENT DOCUMENTS

| | | | |
|---|---|---|---|
| 0268180 | 5/1988 | European Pat. Off. | 385/92 |
| 62-249115 | 10/1987 | Japan | 385/2 |
| WO90/04799 | 3/1990 | WIPO | 385/92 |

OTHER PUBLICATIONS

Meeks et al; "X-Y Probe Light Source"; IBM Technical Disclosure Bulletin; vol. 15, No. 19 Feb. 1973; pp. 2783-2784.

*Primary Examiner*—John Ngo
*Attorney, Agent, or Firm*—Nixon & Vanderhye

[57] ABSTRACT

An optical connector is provided which requires less accurate machining during manufacture, can reduce the number and/or complexity of component parts required and can achieve a standard industrial product which nevertheless maintains very stable connections. In a receptacle for the optical connector, an alignment sleeve aligns and optically connects an optical fiber unit to another optical fiber unit or to an input/output window of other optical elements in a housing. The housing of the receptacle holds the sleeve in an alignment and is comprised of a plurality of housing halves joined along a major plane extending through the axis of the sleeve. The housing halves may include mating surfaces, projections or indents offset from said major plane.

15 Claims, 4 Drawing Sheets

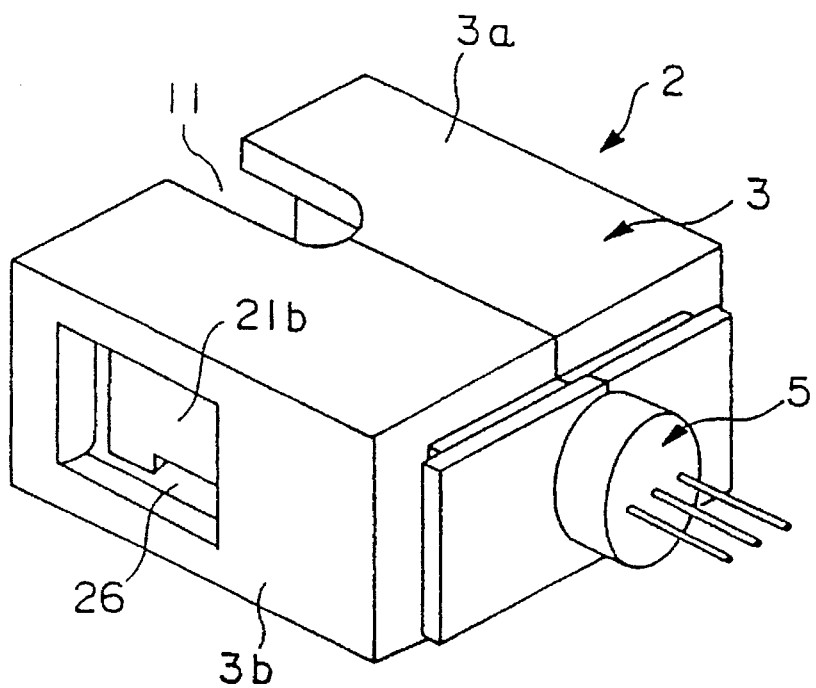
FIG. 2
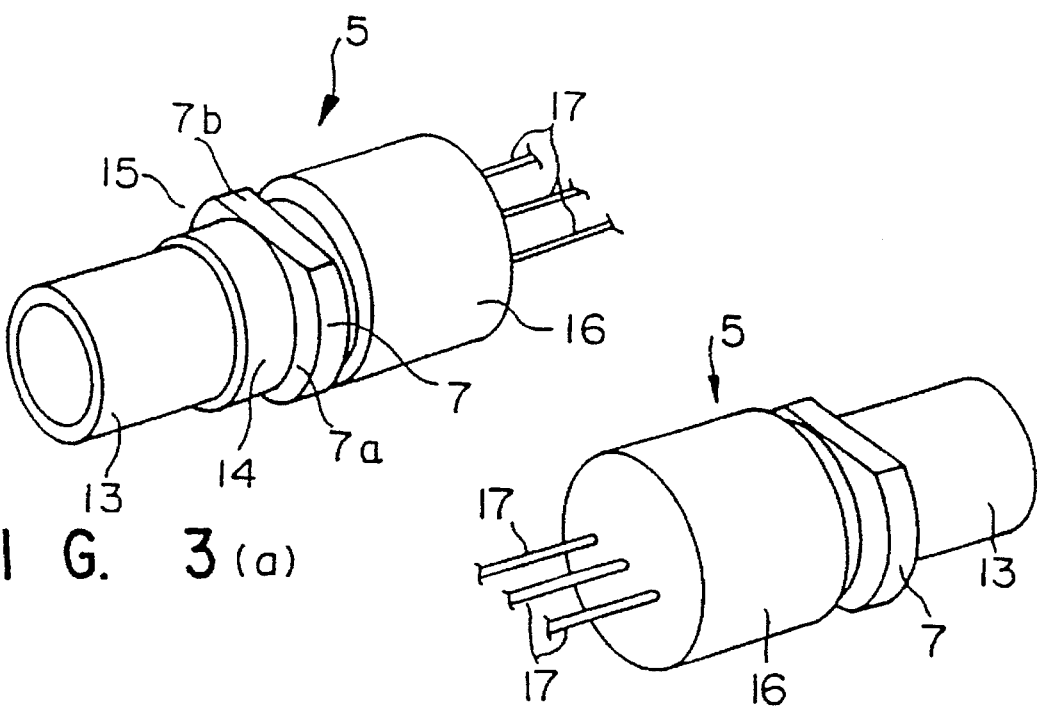
FIG. 3(a)
FIG. 3(b)

OPTICAL CONNECTORS

FIELD OF THE INVENTION

The present invention relates to optical connectors. It relates in particular though not exclusively to receptacles for optical connectors.

BACKGROUND OF THE INVENTION

Optical connectors may serve for optically connecting an optical fiber unit to another fiber unit or an optical fiber unit to other optical elements. The invention has an important application in optical fiber communications apparatus.

Optical connectors which make a mating connection are known for communications and for short-distance data links. Such connectors are suitable for optical cable transmission systems (simply called "FC connectors") and for optical subscriber systems (simply called "SC connector").

Conventional optical connectors, such as for example SC connectors, comprise a plug and an associated socket or receptacle (which is also sometimes referred to as an 'adapter').

The basic arrangement of these components is as follows: The plug comprises a ferrule with an optical fiber unit at its center. The fiber is concentrically surrounded by a sleeve and by a cylindrical jacket, in that order, made from ceramics, metal or polymer. The ferrule is held in a frame, and a positioning key is disposed on the periphery of the frame. A compression spring pushes the ferrule towards its forward end, and the frame itself is fixed to an inner wall surface of a plug housing.

Typically, a conventional receptacle comprises a resin housing which is injection-molded as a single unit. The housing has a cylindrical alignment sleeve extending within the housing in an axial direction. When the plug described above is fitted into the receptacle, the ferrule of the plug becomes aligned with the alignment sleeve. In this manner the end face of the optical fiber unit can be optically connected to and aligned with another optical fiber unit or to other optical elements on the same axis.

Generally, in an optical connector for data links the optical fiber unit is often connected directly to a light emitting device or a light receiving device. In the case of such an opto-electronic transducer module (or "active component"), the housing usually contains optical elements, such as light emitting and/or light receiving devices, and electric circuits, which together perform the conversion between optical and electric signals. The module is incorporated into the receptacle and the receptacle is connected to the plug so that the optical fiber unit is connected to the optical devices to enable the transmission and/or reception of dam.

Conventional optical connectors of the kind just described suffer from connection losses arising from structural defects such as an axial displacement and angle displacement when connecting the optical fiber trait to the optical elements.

Also, to achieve satisfactory axial alignment the inner diameter of the alignment sleeve must closely match the outer diameter of the ferrule, which requires the use of highly accurate manufacturing techniques. Any mounting portions and alignment sections, etc., need also to be accurately formed in the receptacle. To achieve high alignment accuracy, conventional receptacles need to have their alignment sleeve machined in an accurately axial direction. Because of the required degree of accuracy, the interior of the sleeve needs to be formed by a precision machining operation, which creates difficulties in manufacturing. Furthermore, conventional methods such as that described so far, also require that the optical connector be made up of a considerable number of different and/or complex components parts. It is difficult therefore to make a standard product which nevertheless ensures stable connections.

Similar problems arise also with other types of optical connector.

BRIEF DESCRIPTION OF THE INVENTION

The present invention aims to provide an optical connector which can reduce the need to employ high precision machining operations in the manufacture of its housing.

According to the present invention, there is provided a receptacle for an optical connector which includes an alignment sleeve capable of receiving an optical fiber unit having an endface by which optically to connect the optical fiber unit to another optical fiber unit or to a light input and/or output window of an optical component comprising one or more optical elements, the receptacle including a housing which comprises a plurality of sections each divided into sub-sections such that when assembled each sub-section cooperates with its associated subsections to locate the alignment sleeve on the axis of the housing.

According to another aspect of the present invention, a receptacle for an optical connector which includes an alignment sleeve capable of receiving an optical fiber unit having an endface by which optically to connect the optical fiber unit to another optical fiber unit or to a light input and/or output window of an optical component comprising one or more optical elements, the receptacle including a housing which comprises a plurality of sections each divided into pairs of half-sections such that each pair of half-section holds the alignment sleeve on a predetermined axis of the housing.

Preferably each section comprises a pair of half-sections.

According to yet another aspect of the present invention, there is provided a receptacle for an optical connector which includes an alignment sleeve capable of receiving an optical fiber unit having an endface by which optically to connect the optical fiber unit to another optical fiber unit or to a light input and/or output window of an optical component comprising one or more optical elements, the receptacle including a housing which comprises a plurality of sections which are divided into sub-sections that are joined along a major mating plane extending through the axis of the sleeve.

The housing subsections preferably comprise housing halves. The halves may include mating surfaces, projections or indents offset from said major plane.

The alignment sleeve typically forms part of an active optical component held between opposing sides of the housing halves.

A flange may be formed on a housing section of the active component and a matching recesses in each so that, when the housing halves are assembled, the recesses hold the flange in place.

The housing halves may be asymmetric in that on a half may have a projection on a mating surface and the other housing half a corresponding aperture so that, upon the assembly, the projection of said one housing half is fitted into the aperture of said other housing half to achieve a positional alignment.

Snap-fit connection may be provided between the matching housing halves.

The housing halves may further include associated latch sections, so that when the the housing halves are assembled into the housing, the latch sections define a latch in which a support frame is fined.

For easier and more cost effective manufacture of the half-sections, the half-sections of a section are preferably mirror images or near mirror images of each other. Half-sections of a section which do not form mirror or near mirror images of each other, may conveniently be rotationally symmetric.

By adopting the foregoing principles the present invention permits a high precision product to be obtained while reducing or even eliminating the need for precision machining operations in the manufacture of the product. Additionally, the present invention can help to reduce the number and or complexity of different component parts involved. The present invention also helps in the aim to manufacture a standard product which nevertheless provides long term stable and repeatable optical connections.

DESCRIPTION OF THE DRAWINGS

The present invention will now be described further by way of example only and with reference to the accompanying drawings of which:

FIG. 2 is a perspective view showing an assembled receptacle of the optical connector, FIG. 3(a) is a perspective view showing an active component for use in the receptacle;

FIG. 3(b) is a perspective view showing another active component, viewed from the opposite direction to FIG. 3a;

Referring now also to the accompanying drawings, FIG. 1 shows an optical connector comprising a plug 1 and an associated receptacle 2 having a rectangular housing 3. The housing 3 is of a split type and has two injection-molded housing halves or shell halves 3a and 3b made of synthetic resin. The housing halves when combined together as shown in FIG. 2, provide the rectangular housing 3. The housing 3 has a rectangular opening 4 at one end.

Figure 1:
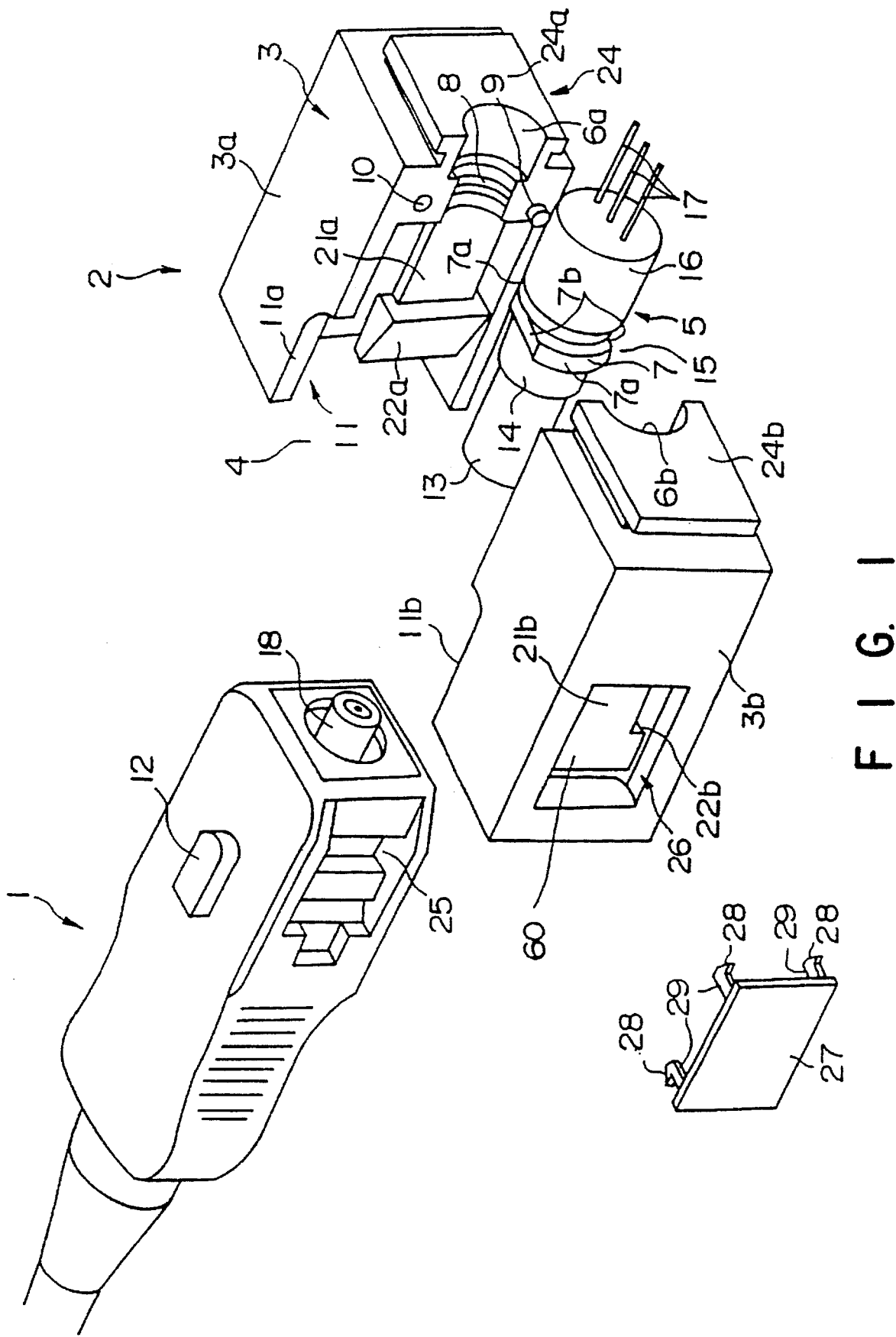
FIG. 1 is a perspective view showing an exploded view of the receptacle of an optical connector, and a plug.

The housing halves 3a and 3b grip the rear end portion of an active component 5 between them at their mating end portions. A pair of recesses 6a, 6b are provided in the opposing inner walls of the rear ends of the housing halves which hold the rear end portion of the active component 5 fixedly between them when the housing halves 3a, 3b are joined together. A retaining groove 8 is provided in the inner wall of the respective recesses 6a and 6b. The retaining groove 8 accommodates a flange 7 which is provided on the outer periphery of the active component 5. A projection 9 and hole 10 are formed in the mating faces of the rear portion of the housing halves 3a and 3b. When the housing 3 is assembled, the housing halves 3a, 3b are joined together and the projection 9 is fit into the corresponding hole 10 so that the housing halves 3a and 3b are positionally aligned with each other.

Cut-outs 11a and 11b are provided at the forward end portions of the mating faces of the housing halves 3a and 3b and provide a key-way 11 when the housing halves 11a and 11b are assembled together as shown in FIG. 2. A key 12 is provided on the outer surface of the plug 1 and is adapted to be inserted into the key-way 11 which is in the form of a groove. Upon the insertion of the plug 1 into the receptacle 2, the key 12 is entered into the key-way 11 to align the plug 1 so that a forward section 18 of the plug is inserted into an aligning sleeve 13 of the active component 5.

As shown in FIG. 3, the active component 5 comprises the sleeve 13 which serves to align the forward section 18 of the plug with it. A module housing 15 consists of an integral unit of an axially extending cylindrical tube section 14 and flange 7, made of plastics or metal, such as stainless, and a cylindrical housing 16 containing an opto-electronic transducer. The cylindrical housing has a light input/output window for the optical devices (not shown), which opens towards the alignment sleeve 13. The housing 16 contains the optical elements, such as a fight emitting device and light receiving device, and an electric circuit, which together convert optical into electrical signals or vice versa. Electric leads 17 are taken out of the wall of the housing 16 which is opposite the input/output window of the housing 16.

In order to provide a satisfactory optical connection between the active component 5 and an optical fiber unit (not shown), the alignment sleeve 13 is formed as a thin-wailed sleeve of low Young's modulus. Zirconia ceramics, for example, is a suitable choice of material. The alignment sleeve could instead be of suitable plastics material or metal. The housing 15 advantageously consists of a single integral piece forming the alignment section 13, the flange 7 and device housing 16. This ensures a connection of relatively good coupling characteristic and stable connection when the ferrule 18 of the plug is inserted into the sleeve of the ferrule alignment section 13. It is also possible to connect the plug to the receptacle with better repeatability and a relatively low loss.

The flange 7 of the active component 5 includes a retaining section 7a fitted in the grooves 8 of the recesses 6a and 6b and a flat 7b formed perpendicular to the axis of the alignment sleeve. The flange 7 is registered in the groove 8 upon the insertion of the active component 5 into the housing 3.

Elastic latch sections 21a and 21b made of resin are formed as an integral part on the inner walls of the housing halves 3a and 3b respectively. The respective elastic latch sections 21a and 21b have their free end portions extending in a cantilever fashion toward the rectangular opening 4 in the end of the housing 3. Latch hooks 22a and 22b opposed to each are provided at the free end of the elastic latch sections 21a and 21b and, as shown in FIG. 1, extend from within the housing toward the rectangular opening 4.

At the rear end portions of the housing halves 3a and 3b a grooved latch 24 is created when the receptacle 2 is attached to an associated device 5. The grooved latch 24 may be used with a mounting frame for the device. The latch 24 is comprised of two separate latch sections 24a and 24b at the housing halves 3a and 3b which combine to provide a single latch 24 when the housing halves 3a and 3b are assembled into a single housing.

Stepped sections 25 are provided at the right and left sides of the plug 1. When the plug 1 is inserted into the rectangular opening 4 of the receptacle 2, the female 18 section 18 is inserted into the sleeve 13 and the latch hooks 22a and 22b of the elastic latches 21a and 21bare latched to the associated stepped sections 25 of the plug 1. The sleeve 13 is aligned, on the same axis, with the end face of the optical fiber unit and optical elements of the active component 5.

A dust-proof shutter can be provided for the opening 4 of the housing 3 so that it is covered if the plug 1 is withdrawn from the receptacle. The shutter serves to prevent an external exposure of the input/output end of the optical element in the active device which would otherwise occur in the absence of the plug 1.

The shutter may be designed to snap fit into the housing half 3b. Additionally, if two complete assemblies (11, 3, 5) are required to be placed together as in a duplex application, then the dust cover can be designed as a mating piece to hold the two assemblies.

The assembly of the receptacle 2 will now be explained:

First, the flange 7 of the active component 5 is positioned so that it closely fits the groove 8 of the recess 6a (or 6b) at the rear end portion of one housing haft 3a (or 3b). Then the the associated housing halves 3a and 3b are brought together and fixed to each other along their mating faces.

The halves may, for example, be locked together by a bonding method or ultrasonic or laser welding. As a result of locking the two halves together, the active component 5 will be held between the recesses 6a and 6b of the housing halves 3a and 3b. In this manner the active component 5 is fixed to the housing 3 in an aligned relation, the active component 5 being prevented from moving in the axial direction or being rotated about its axis.

Figure 4A:
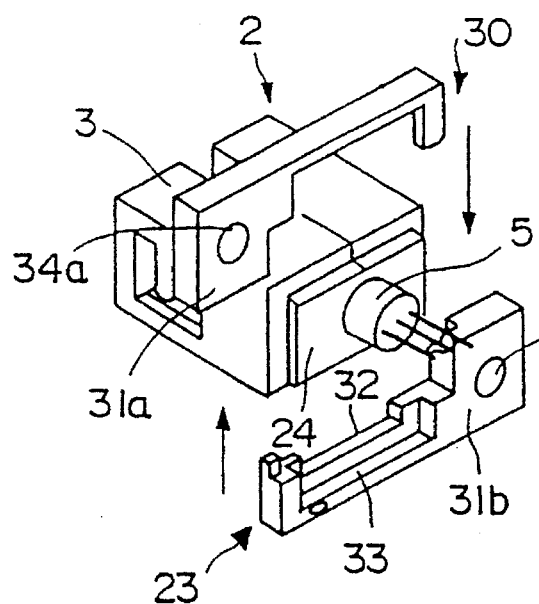
FIG. 4(a) and 4(b), each, are a view showing a frame assembly for attaching and fixing the receptacle to an associated device.
Figure 4B:
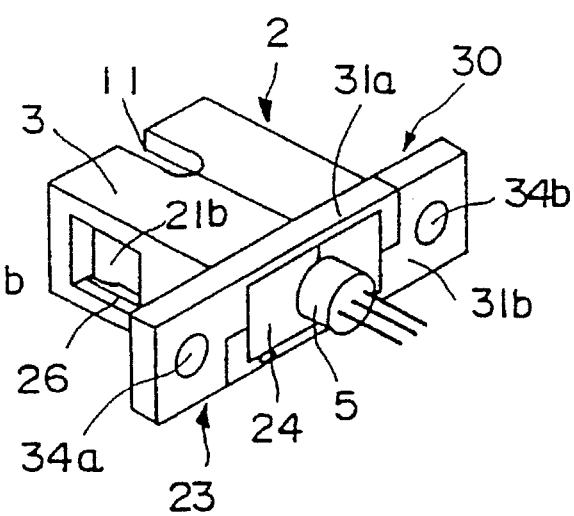

FIG. 4 shows the structure of a mounting frame 30 for locking together the receptacle 2 and the receptacle to the active component 5. The frame 30 is fixed to the grooved latch 24 which is provided at the rear end of the housing 3 of the receptacle 2. The frame 30 comprises upper and lower frame members 31a and 31b. A ridge 32 to be fitted into the groove of the latch 24 and a groove 33 to be fitted onto the ridge of the latch 24 are provided in the respective frame members 31a and 31b to provide a click fitting. As shown in FIG. 4(a), the frame members 31a and 31b are fired over the latch 24 of the receptacle 24 from above and below, respectively, to provide an assembled unit as shown in FIG. 4(b). The frame 30 can by this method be assembled by click-fitting without the need to use any form of bonding or welding. Bonding or welding may, however, be employed in addition, if desired.

The frame members 31a and 31b can be fastened to associated equipment, for example, by screws (not shown), inserted into the corresponding screw holes 34a, 34b of the frame members 31a and 31b.

Figure 5:
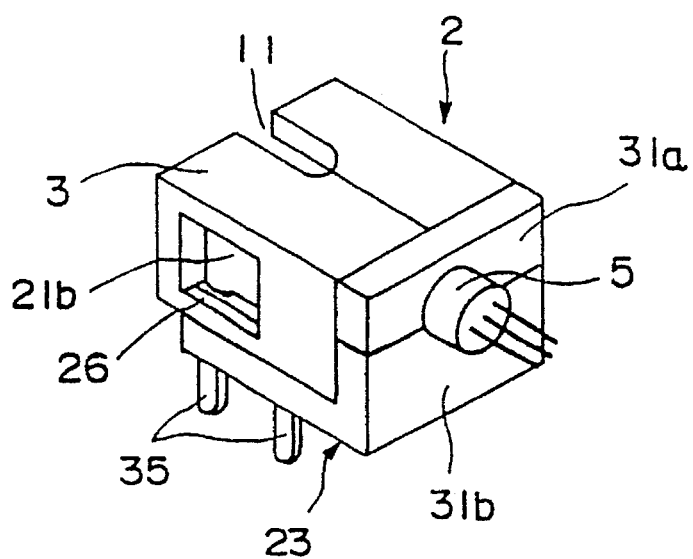
FIG. 5 is a perspective view showing another frame assembly for attaching and fixing the receptacle to an associated device.
Figure 6:
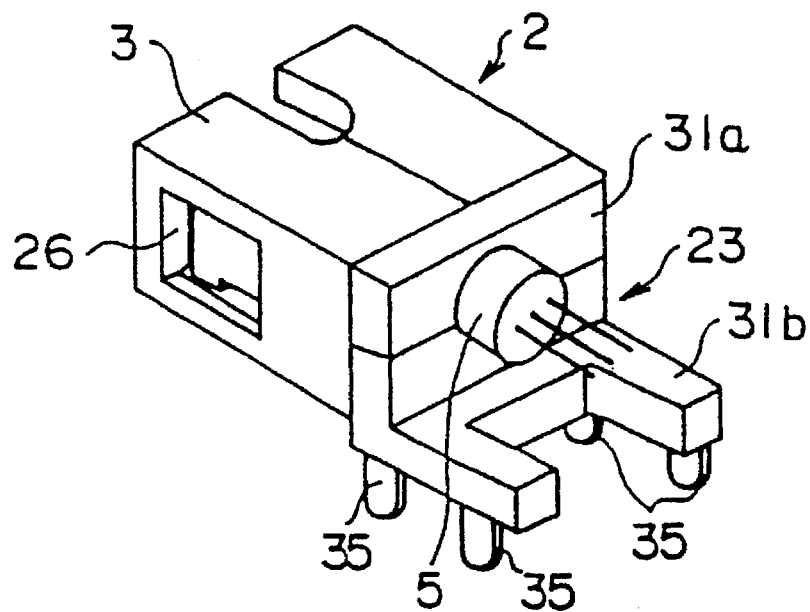
FIG. 6 is a perspective view showing another mechanism for attaching and fixing the receptacle to an associated device.

A frame 30 as shown in FIGS. 5 and 6 is of such a type as to fittingly mount the pair of frame members 31a and 31b on the latch 24 provided on the rear end of the receptacle 2 as in the case of the embodiment of FIG. 4; however the frame member 31b of FIGS. 5 and 6, is distinct from the frame member 31b of FIG. 4, is equipped with metal legs 35. This enables the frame 30 of FIG. 5 to be fixed to a circuit board (not shown), by its legs 35 which are inserted into the corresponding through holes in the circuit board and deformed by, for example, bending. The frame member 31b as shown in FIG. 5 is contacted with the lower surface of a housing 3 of a receptacle 2. The frame member 31b as shown in FIG. 6 is projected rearwardly away from a housing 3 of a receptacle 2. In the case of the embodiments shown the legs 35 are not intended for providing electrical connection between the active component 5 and circuitry on the aforementioned circuit board. Instead, they merely serve the purpose of mechanically securing the receptacle 2 to the circuit board.

Figure 7:
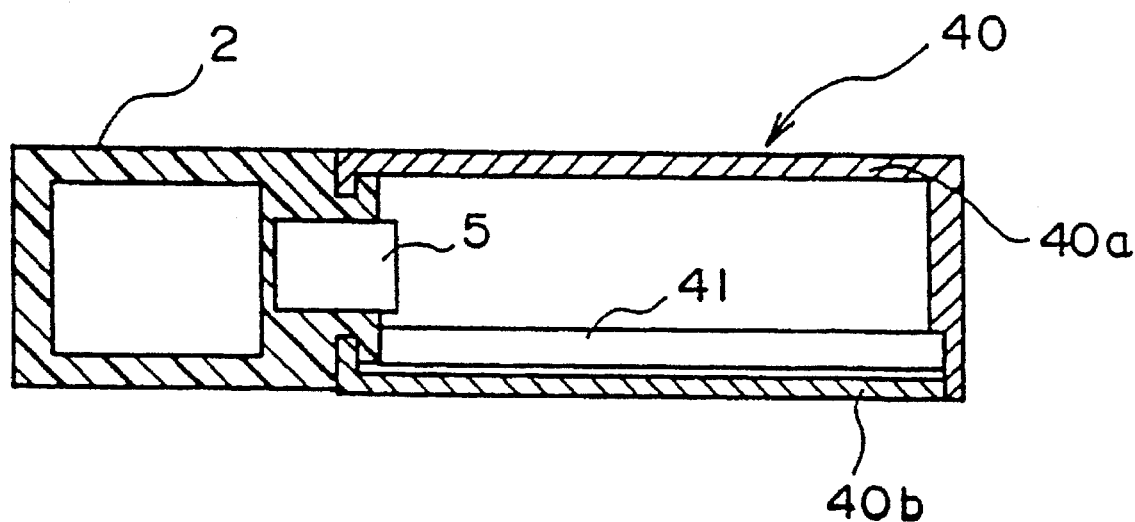
FIG. 7 is a sectional view showing a structure which includes an electric circuit mounted in the housing of the receptacle.

In FIG. 7, a further module housing 40 is mounted on the latch 24 provided on the receptacle 2 of the present invention. The housing 40 contains a circuit board 41 incorporating an electric circuit for converting the electrical signal output of an optical receiving device into to an electrical output signal, or an electrical input signal into a drive signal for an optical transmitting device of the active component 5. The housing 40 comprises a top housing section 40a and bottom housing section 40b. The housing 40 is mounted on a latch 24 of the receptacle 2 in the same way as the frame 30 already described with reference to FIGS. 4 to 6. That is, the housing 40 has the separate top and bottom housing 40a and 40b and can be assembled, together with the latch 24 of the receptacle 2, into a box-type housing.

As already set out above, because a split type housing is employed so that separate housing halves can be individually manufactured, the receptacle for an optical connector in accordance with the invention can eliminate the need for precision machining operation in its manufacture. In particular, it is no longer necessary to accurately machine a length of an alignment sleeve with great accuracy to match a ferrule to be inserted. Much labour can be saved in this way, and it is no longer necessary to provide high precision machines. The receptacle can readily be formed as low cost housing halves, and even the number of complex component parts involved can be reduced. Since, according to the present invention, the receptacle is of a split type, it is possible to manufacture the housing halves for mounting the sleeve and active component, in both the axial and radial directions. Since any proper machining can simply be made so as to conform to the active component, any conventional expensive machining method is not necessary. Further it is also possible to obtain the advantages of securing a highly stable optical-connection characteristic and to readily connect and fix an optical fiber unit to another optical unit or associated optical elements and hence to obtain an inexpensive receptacle with a shorter assembling time.

Upon the assembling of the housing, the housing halves are joined together with the use of a combination of projections and associated holes so that a positional alignment of the housing halves can be achieved readily and accurately.

Further, since a single latch is created from the separate latch sections upon the assembling of the housing halves into a housing, a support frame can readily be fixed to the latch without any bonding or welding method.

I claim:

1. A receptacle for an optical connector for connecting an active optical element to an optical fiber unit via an alignment sleeve capable of receiving the optical fiber unit, the receptacle including a housing having at least two halves and an optical component in which the active optical element is mounted in alignment with the alignment sleeve, wherein, upon assembling of the housing halves into the housing, the housing holds the optical component between opposing sides of the housing halves.

2. The receptacle according to claim 1, wherein a flange is formed on a housing section of the active component and recesses are provided as a one-end face side of the mating housing halves to hold the flange in place, upon the assembling of the housing halves into the housing, so that the housing section of the active component is held between the opposing sides of the housing halves.

3. The receptacle according to claim 1, wherein one of the housing halves has a projection at its mating side surface and the other housing half has a corresponding hole at its mating side surface so that, upon the assembling of the housing halves into the housing, the projection of said one housing half is fitted into the hole of said other housing half to achieve a positional alignment.

4. The receptacle according to claim 1, wherein the housing halves at a rear wall have associated grooved latch sections, respectively, and, upon the assembling of the housing halves into the housing, the grooved latch sections define a latch in which a support frame is fitted.

5. A component for an optical transmission system including an optical connector which comprises a receptacle according to claim 1.

6. A receptacle for an optical connector as claimed in claim 1, wherein the housing comprises a plurality of sections each divided into half-sections such that each half-section holds the alignment sleeve on the axis of the housing.

7. The receptacle according to claim 6, wherein a flange is formed on a housing section of the active component and recesses are provided as a one-end face side of the mating housing halves to hold the flange in place, upon the assembling of the housing halves into the housing, so that the housing section of the active component is held between the opposing sides of the housing halves.

8. The receptacle according to claim 6, wherein one of the housing halves has a projection at its mating side surface and the other housing half has a corresponding hole at its mating side surface so that, upon the assembling of the housing halves into the housing, the projection of said one housing half is fitted into the hole of said other housing half to achieve a positional alignment.

9. The receptacle according to claim 6, wherein the housing halves at a rear wall have associated grooved latch sections, respectively, and, upon the assembling of the housing halves into the housing, the grooved latch sections define a latch in which a support frame is fitted.

10. A component for an optical transmission system including an optical connector which comprises a receptacle according to claim 6.

11. A receptacle for an optical connector as claimed in claim 6, wherein the alignment sleeve lies in the dividing planes of the housing sections.

12. The receptacle according to claim 11, wherein a flange is formed on a housing section of the active component and recesses are provided as a one-end face side of the mating housing halves to hold the flange in place, upon the assembling of the housing halves into the housing, so that the housing section of the active component is held between the opposing sides of the housing halves.

13. The receptacle according to claim 11, wherein one of the housing halves has a projection at its mating side surface and the other housing half has a corresponding hole at its mating side surface so that, upon the assembling of the housing halves into the housing, the projection of said one housing half is fitted into the hole of said other housing half to achieve a positional alignment.

14. The receptacle according to claim 11, wherein the housing halves at a rear wall have associated grooved latch sections, respectively, and, upon the assembling of the housing halves into the housing, the grooved latch sections define a latch in which a support frame is fitted.

15. A component for an optical transmission system including an optical connector which comprises a receptacle according to claim 11.

* * * * *